(12) United States Patent
Cobb et al.

(10) Patent No.: US 11,448,293 B2
(45) Date of Patent: Sep. 20, 2022

(54) VARIABLE FORCE TENSIONER WITH INTERNAL RESERVOIR TECHNOLOGY PRIMARY BORE

(71) Applicant: BorgWarner Inc., Auburn Hills, MI (US)

(72) Inventors: Keith B. Cobb, Cortland, NY (US); Kevin Todd, Freeville, NY (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/966,320

(22) PCT Filed: Feb. 26, 2018

(86) PCT No.: PCT/US2018/019640
§ 371 (c)(1),
(2) Date: Jul. 30, 2020

(87) PCT Pub. No.: WO2019/164525
PCT Pub. Date: Aug. 29, 2019

(65) Prior Publication Data
US 2020/0370625 A1    Nov. 26, 2020

(51) Int. Cl.
*F16H 7/08*    (2006.01)

(52) U.S. Cl.
CPC ............ *F16H 7/0848* (2013.01); *F16H 7/08* (2013.01); *F16H 2007/0802* (2013.01);
(Continued)

(58) Field of Classification Search
CPC ............... F16H 7/08; F16H 2007/0802; F16H 2007/0806; F16H 2007/0812;
(Continued)

(56) References Cited

U.S. PATENT DOCUMENTS

| 976,010 | A | 11/1910 | Thompson |
| 979,811 | A | 12/1910 | Wallem |

(Continued)

FOREIGN PATENT DOCUMENTS

| CN | 106051082 A | 10/2016 |
| DE | 4035823 C1 | 12/1991 |

(Continued)

OTHER PUBLICATIONS

JP2005140237A Translation; Nakao et al; Tension Adjusting Device For Wrapping Connecting Member; Published: Jun. 2, 2005; Published By: Espacenet (Year: 2005).*

(Continued)

*Primary Examiner* — Michael R Mansen
*Assistant Examiner* — Raveen J Dias
(74) *Attorney, Agent, or Firm* — Brown & Michaels, PC (57) ABSTRACT

A variable force tensioner (VFT) system that includes a primary piston split into two chambers disposed within a primary bore. The two chambers including a first low pressure chamber having a primary reservoir therein that feeds fluid through a check valve into a second high pressure chamber to control a biasing force on the primary piston. A piston bore clearance path can extend along a groove in the primary bore to feed oil back to the primary reservoir from the high pressure chamber.

8 Claims, 7 Drawing Sheets

(52) U.S. Cl.
CPC ............... *F16H 2007/0806* (2013.01); *F16H 2007/0812* (2013.01); *F16H 2007/0853* (2013.01); *F16H 2007/0855* (2013.01); *F16H 2007/0859* (2013.01)

(58) Field of Classification Search
CPC .......... F16H 7/0848; F16H 2007/0855; F16H 2007/0859; F16H 2007/0891; F16H 2007/0895; F16H 2007/0897; F16H 7/0834; F16H 7/0836; F16H 2007/0814; F16H 2007/0851; F16H 2007/0853
USPC ........................................................ 474/110
See application file for complete search history.

(56) References Cited

U.S. PATENT DOCUMENTS

| | | | |
|---|---|---|---|
| 1,613,145 A | | 1/1927 | Trump |
| 1,682,602 A | | 8/1928 | Dawley |
| 1,915,694 A | | 6/1933 | Reindel |
| 2,167,721 A | | 8/1939 | La |
| 2,273,737 A | | 2/1942 | Snyder |
| 2,308,876 A | | 1/1943 | Hammett |
| 2,767,733 A | | 10/1956 | Anderson |
| 2,853,159 A | | 9/1958 | Kuhn |
| 2,908,109 A | | 10/1959 | Irving |
| 2,960,109 A | | 11/1960 | Wilson |
| 3,169,548 A | | 2/1965 | Mcintosh |
| 3,269,409 A | | 8/1966 | William |
| 3,304,952 A | | 2/1967 | Krone |
| 3,415,272 A | | 12/1968 | Blackhawk et al. |
| 3,437,065 A | | 4/1969 | Robbins, Jr. |
| 3,536,094 A | | 10/1970 | Manley, Jr. |
| 3,719,401 A | | 3/1973 | Peruglia |
| 3,913,322 A | | 10/1975 | Over et al. |
| 4,018,247 A | | 4/1977 | Carr |
| 4,237,935 A | | 12/1980 | Delmonte et al. |
| 4,253,524 A | | 3/1981 | Erickson |
| 4,278,106 A | | 7/1981 | Cunningham |
| 4,507,103 A | | 3/1985 | Mittermeier |
| 4,526,195 A | | 7/1985 | Humphrey et al. |
| 4,628,957 A | | 12/1986 | Hofer et al. |
| 4,648,369 A | | 3/1987 | Wannenwetsch |
| 4,708,696 A * | | 11/1987 | Kimura .................. F16H 7/1236 474/103 |
| 4,772,251 A | | 9/1988 | Goppelt et al. |
| 4,792,322 A | | 12/1988 | Goppelt et al. |
| 4,940,447 A | | 7/1990 | Kawashima et al. |
| 5,183,075 A | | 2/1993 | Stein |
| 5,234,383 A * | | 8/1993 | Harada .................. F16H 7/1236 474/110 |
| 5,271,429 A | | 12/1993 | Bauer et al. |
| 5,346,436 A | | 9/1994 | Hunter et al. |
| 5,406,976 A | | 4/1995 | Bekki |
| 5,441,457 A * | | 8/1995 | Tsutsumi .................. F16H 7/08 474/110 |
| 5,449,018 A | | 9/1995 | Harris |
| 5,469,883 A | | 11/1995 | Lee |
| 5,511,583 A | | 4/1996 | Bassett |
| 5,569,105 A * | | 10/1996 | Sakai ..................... F02B 67/06 474/110 |
| 5,637,047 A | | 6/1997 | Schulze |
| 5,655,567 A | | 8/1997 | Mikel |
| 5,700,213 A | | 12/1997 | Simpson et al. |
| 5,707,309 A | | 1/1998 | Simpson |
| 5,819,794 A | | 10/1998 | Anderson |
| 5,879,256 A | | 3/1999 | Tada |
| 5,924,438 A | | 7/1999 | Cimminelli et al. |
| 5,967,920 A | | 10/1999 | Dembosky et al. |
| 5,993,341 A | | 11/1999 | Anderson |
| 6,142,168 A | | 11/2000 | Sumrall |
| 6,193,623 B1 | | 2/2001 | Koch et al. |
| 6,298,873 B1 | | 10/2001 | LeVey et al. |
| 6,361,458 B1 | | 3/2002 | Smith |
| 6,383,103 B1 | | 5/2002 | Fujimoto et al. |
| 6,435,993 B1 | | 8/2002 | Tada |
| 6,510,868 B2 | | 1/2003 | Penza |
| 6,537,043 B1 | | 3/2003 | Chen |
| 6,575,192 B1 | | 6/2003 | Shaffer |
| 6,581,632 B2 | | 6/2003 | Walpole et al. |
| 6,592,479 B2 | | 7/2003 | Nakakubo et al. |
| 6,716,124 B2 | | 4/2004 | Markley |
| 6,811,505 B2 | | 11/2004 | Hashimoto et al. |
| 7,028,708 B1 | | 4/2006 | Langenfeld et al. |
| 7,108,621 B2 | | 9/2006 | Ullein et al. |
| 7,174,799 B2 | | 2/2007 | Yoshida et al. |
| 7,258,134 B1 | | 8/2007 | Langenfeld et al. |
| 7,367,353 B1 | | 5/2008 | Langenfeld et al. |
| 7,404,776 B2 | | 7/2008 | Yoshida |
| 7,427,249 B2 | | 9/2008 | Yoshida |
| 7,568,497 B1 | | 8/2009 | Langenfeld et al. |
| 7,618,339 B2 | | 11/2009 | Hashimoto et al. |
| 7,775,921 B2 | | 8/2010 | Izutsu et al. |
| 7,775,924 B2 | | 8/2010 | Koch |
| 7,913,715 B2 | | 3/2011 | Martin |
| 8,002,656 B2 | | 8/2011 | Emizu et al. |
| 8,137,224 B2 | | 3/2012 | Emizu et al. |
| 8,403,783 B2 | | 3/2013 | Wigsten |
| 8,574,106 B2 | | 11/2013 | Botez |
| 8,585,519 B2 | | 11/2013 | Hartmann |
| 8,951,154 B2 | | 2/2015 | Konuma et al. |
| 9,309,878 B2 | | 4/2016 | Columpsi |
| 9,765,770 B2 | | 9/2017 | Babbini et al. |
| 10,941,839 B2 * | | 3/2021 | Benn ..................... F16H 7/06 |
| 2001/0032675 A1 | | 10/2001 | Russell |
| 2002/0022541 A1 | | 2/2002 | Ullein et al. |
| 2002/0098932 A1 | | 7/2002 | Hashimoto et al. |
| 2003/0008738 A1 | | 1/2003 | Rossato et al. |
| 2003/0125143 A1 | | 7/2003 | Seungpyo |
| 2003/0186765 A1 * | | 10/2003 | Konishi ................ F16H 7/0836 474/109 |
| 2004/0154666 A1 | | 8/2004 | Gessat et al. |
| 2004/0214671 A1 | | 10/2004 | Clayton |
| 2004/0266572 A1 | | 12/2004 | Yoshida et al. |
| 2005/0014587 A1 * | | 1/2005 | Konishi ................ F16H 7/0836 474/110 |
| 2005/0064969 A1 | | 3/2005 | Tomita et al. |
| 2005/0227799 A1 | | 10/2005 | Yoshida |
| 2006/0063625 A1 | | 3/2006 | Emizu et al. |
| 2006/0094549 A1 | | 5/2006 | Yoshida et al. |
| 2006/0270500 A1 * | | 11/2006 | Yamamoto ............ F16H 7/0836 474/109 |
| 2007/0044846 A1 | | 3/2007 | Ashurst et al. |
| 2008/0261737 A1 | | 10/2008 | Yoshida et al. |
| 2008/0289703 A1 | | 11/2008 | Penzone et al. |
| 2008/0293526 A1 | | 11/2008 | Wigsten |
| 2008/0318717 A1 * | | 12/2008 | Kurematsu ........... F16H 7/0848 474/110 |
| 2009/0197721 A1 | | 8/2009 | Emizu et al. |
| 2010/0004080 A1 | | 1/2010 | He |
| 2010/0090149 A1 | | 4/2010 | Thompson et al. |
| 2011/0015013 A1 | | 1/2011 | Hofmann et al. |
| 2011/0237370 A1 | | 9/2011 | Hartmann |
| 2011/0263366 A1 | | 10/2011 | Botez |
| 2012/0192821 A1 * | | 8/2012 | Herbert ................... F01L 1/022 123/90.31 |
| 2013/0017913 A1 | | 1/2013 | Hartmann |
| 2013/0313057 A1 | | 11/2013 | Tsukahara et al. |
| 2013/0324337 A1 * | | 12/2013 | Yoshida ................ F16H 7/0836 474/110 |
| 2014/0100068 A1 | | 4/2014 | Kurematsu |
| 2014/0179471 A1 * | | 6/2014 | Markley ............... F16H 7/0836 474/110 |
| 2014/0200104 A1 * | | 7/2014 | Kurematsu ............... F16H 7/08 474/110 |
| 2014/0256486 A1 | | 9/2014 | Lunk et al. |
| 2015/0267789 A1 | | 9/2015 | Kurematsu et al. |
| 2015/0292602 A1 | | 10/2015 | Kurematsu et al. |
| 2015/0330482 A1 * | | 11/2015 | Todd .................... F16H 7/0836 474/109 |
| 2015/0354674 A1 | | 12/2015 | Markley et al. |
| 2016/0033016 A1 * | | 2/2016 | Todd .................... F16H 7/0836 474/111 |

(56) References Cited

U.S. PATENT DOCUMENTS

| | | | |
|---|---|---|---|
| 2016/0123435 A1* | 5/2016 | Yoshida | F16H 7/08 474/110 |
| 2016/0153530 A1* | 6/2016 | Kitamura | F16H 7/08 474/110 |
| 2016/0186838 A1 | 6/2016 | Kurematsu | |
| 2016/0290447 A1 | 10/2016 | Kunimatsu et al. | |
| 2016/0327135 A1 | 11/2016 | Fischer et al. | |
| 2016/0348765 A1* | 12/2016 | Ishikawa | F16H 7/0836 |
| 2016/0356365 A1 | 12/2016 | Crump et al. | |
| 2017/0130807 A1 | 5/2017 | Kurematsu | |
| 2017/0138443 A1 | 5/2017 | Kurematsu | |
| 2018/0087628 A1 | 3/2018 | Maeda et al. | |
| 2018/0128354 A1 | 5/2018 | Watanabe | |
| 2018/0274638 A1 | 9/2018 | Watanabe et al. | |
| 2018/0363740 A1* | 12/2018 | Kimura | F16H 7/0848 |
| 2019/0011022 A1* | 1/2019 | Miyazawa | F16K 27/0245 |
| 2019/0107178 A1 | 4/2019 | Yoshida et al. | |
| 2019/0128389 A1 | 5/2019 | Ullein et al. | |
| 2019/0234494 A1* | 8/2019 | Cobb | F16H 7/0836 |
| 2019/0257390 A1* | 8/2019 | Watanabe | F16H 7/08 |
| 2019/0316657 A1 | 10/2019 | Cobb et al. | |
| 2019/0360559 A1 | 11/2019 | Sato | |
| 2020/0200239 A1* | 6/2020 | Cobb | F16H 7/08 |
| 2020/0271199 A1* | 8/2020 | Hunt | F16H 7/08 |
| 2020/0284325 A1* | 9/2020 | Hunt | F16H 7/08 |
| 2021/0010570 A1* | 1/2021 | Kurematsu | F16H 7/0848 |
| 2021/0054912 A1* | 2/2021 | Cobb | F16H 7/08 |
| 2021/0123509 A1* | 4/2021 | Kimura | F16H 7/08 |

FOREIGN PATENT DOCUMENTS

| | | |
|---|---|---|
| DE | 19957527 A1 | 6/2000 |
| DE | 102009049245 A1 | 5/2010 |
| DE | 102012218891 A1 | 4/2014 |
| EP | 0645289 A2 | 3/1995 |
| EP | 0919744 A1 | 6/1999 |
| EP | 1201964 A2 | 5/2002 |
| GB | 2410332 A | 7/2005 |
| JP | 2005140237 A | 6/2005 |
| JP | 2014077465 A | 5/2014 |
| JP | 2015183767 A | 10/2015 |
| JP | 2016509187 A | 3/2016 |
| JP | 2016121721 A | 7/2016 |
| KR | 20100091316 A | 8/2010 |
| KR | 20150096686 A | 8/2015 |
| KR | 20150141183 A | 12/2015 |
| WO | 2008027067 A1 | 3/2008 |
| WO | 2012106093 A3 | 10/2012 |
| WO | 2012118723 A3 | 10/2012 |
| WO | 2014138400 A1 | 9/2014 |
| WO | 2015048560 A9 | 5/2015 |
| WO | 2015084592 A1 | 6/2015 |
| WO | 2015110104 A1 | 7/2015 |
| WO | 2015116606 A1 | 8/2015 |

OTHER PUBLICATIONS

International Search Report for PCT/2016/030908 dated Aug. 16, 2016.

International Search Report for PCT/US2014/066496 dated Mar. 16, 2015.

International Search Report for PCT/US2017/047101 dated Nov. 27, 2017.

International Search Report for PCT/US2018/019640 dated Nov. 26, 2018.

Supplementary European Search Report for EP18907029 dated Jun. 18, 2021.

* cited by examiner

VARIABLE FORCE TENSIONER WITH INTERNAL RESERVOIR TECHNOLOGY PRIMARY BORE

BACKGROUND OF THE INVENTION

Field of the Invention

The invention pertains to the field of hydraulic tensioners. More particularly, the invention pertains to a dual hydraulic force tensioner with a reservoir integrated into a primary piston thereof that can provide for faster fluid flow into a high pressure chamber of the piston.

Description of Related Art

Dual hydraulic variable force tensioner (VFT) systems utilize a dual piston design with a reservoir on the back side of the tensioner. Fluid flows from the reservoir side into both pistons from the bottom of the tensioner through a check valve to fill the high pressure chambers within the pistons. A primary piston is forced, by a high pressure within the piston chamber, to contact a tensioner arm to maintain tension on a chain or belt of an engine.

Figure 1:
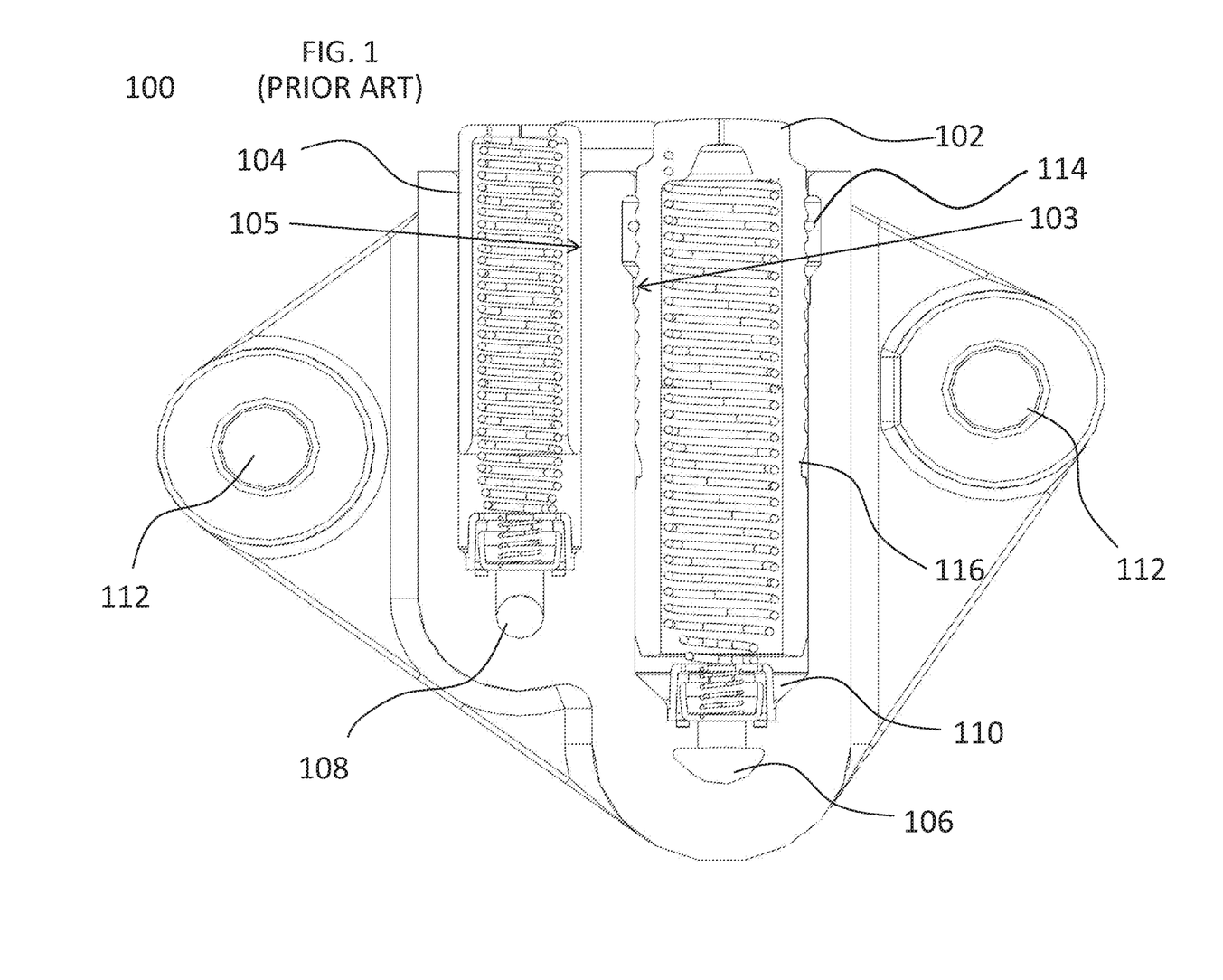
FIG. 1 shows a perspective view of a front side of a conventional variable force tensioner (VFT)

FIG. 1 illustrates a front side of a conventional variable force tensioner (VFT) 100 including a primary piston 102 disposed within a primary bore 103, a secondary piston 104 disposed within a secondary bore 105, a primary low pressure chamber (LPC) to high pressure chamber (HPC) inlet 106, a secondary low pressure chamber (LPC) to high pressure chamber (HPC) inlet 108 and a high pressure piston bore clearance path 110.

Figure 2:
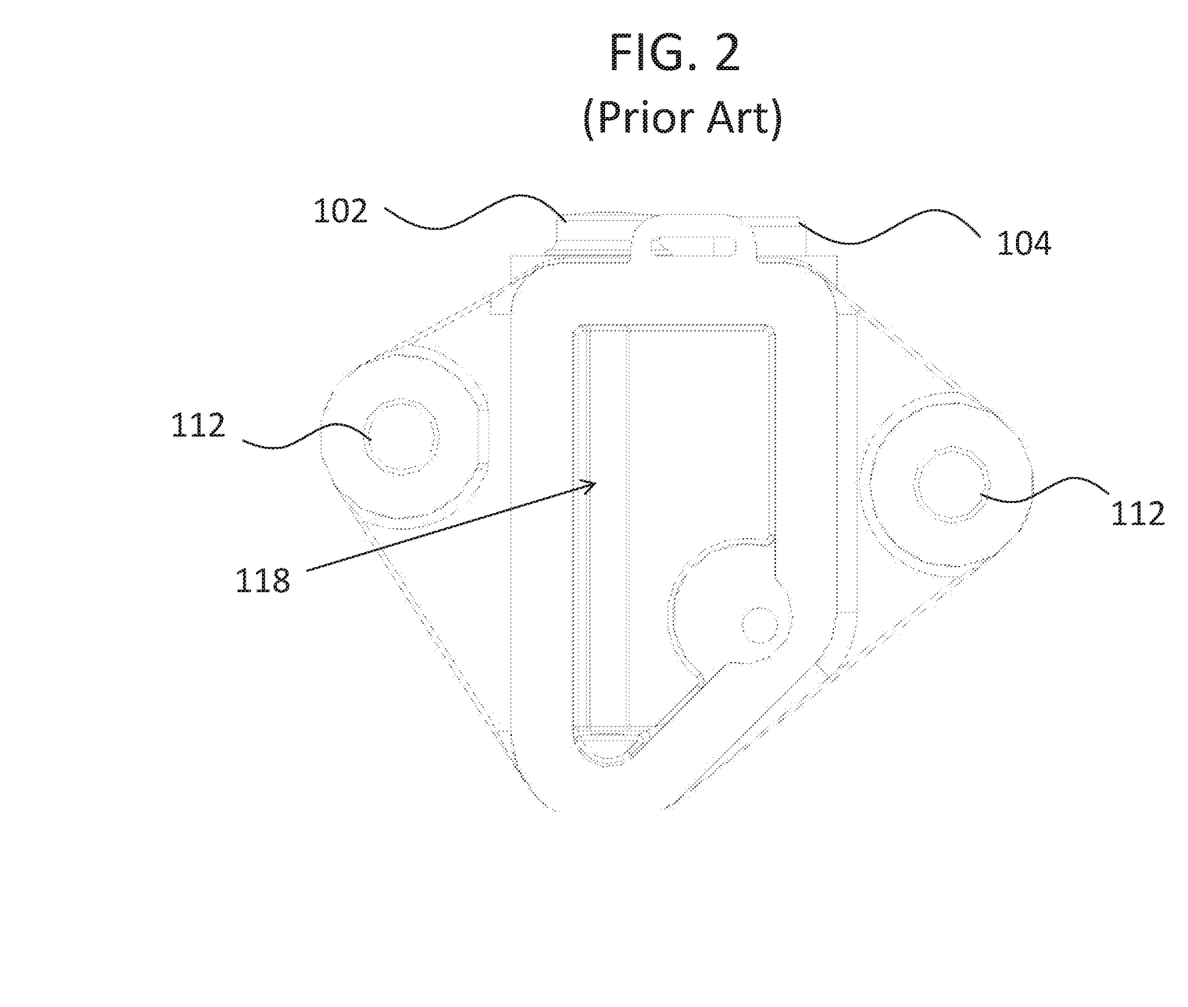
FIG. 2 shows a perspective view of a back side of the VFT of FIG. 1.

FIG. 2 illustrates a back side of the tensioner, where a shared reservoir 118 provides fluid to both pistons 102 and 104 via the primary LPC to HPC 106 (see FIG. 1) and the secondary LPC to HPC 108 (see FIG. 1), respectively. The tensioner 100 is connected to the engine via bolts (not illustrated) extending through two holes 112 and corresponding holes extending into the engine (not illustrated). A ratchet clip 114 (FIG. 1) is disposed to extend around an interior of the primary bore 103 to prevent the piston 102 from sliding back into the primary bore 103. A stop groove 116 is disposed on an outer surface of the piston 102 to be caught by the ratchet clip 114 so that the piston 102 is limited as to how far out of the bore 103 it may extend.

SUMMARY OF THE INVENTION

The foregoing embodiments of the present inventive concept provide a variable force tensioner (VFT) that includes: a housing; a first bore disposed in the housing and having a bottom end; a primary piston slidably disposed in the first bore and including a low pressure chamber (LPC) disposed therein and a low pressure chamber to high pressure chamber (LPC to HPC) inlet connected at one end thereof, the primary piston creating a high pressure chamber (HPC) between a bottom portion thereof and the bottom end of the first bore when fluid is fed through the LPC to HPC inlet from the LPC; a spring disposed within the high pressure chamber and applying a bias on the primary piston away from the bottom of the first bore; a check valve connected to the LPC to HPC inlet and configured to allow fluid to flow from the low pressure chamber to the high pressure chamber to force the primary piston to extend outward of the first bore; and a second bore disposed in the housing and including a second piston having a hollow interior, a second check valve and a second bore LPC to HPC inlet, the second check valve being connected between the second piston and the second bore LPC to HPC inlet to control the flow of fluid from the LPC to HPC inlet to the hollow interior of the second piston to force the second piston to extend outward of the second bore.

In an embodiment of the inventive concept, the lower pressure chamber includes a primary reservoir.

In another embodiment of the inventive concept, the primary reservoir includes a second inlet to receive fluid from an external source.

In another embodiment of the inventive concept, the first bore includes a first portion and a second portion, the first portion having a first diameter and the second portion having a second diameter wider than the first diameter and disposed within a section of the first portion and transfers additional fluid from the external source to the second inlet of the primary reservoir.

In still another embodiment of the inventive concept, the first bore includes at least one high pressure piston bore clearance path extending axially along an internal side surface thereof from the closed end thereof to the second diameter thereof allowing excess fluid from the HPC to flow back to the primary reservoir, the at least one high pressure piston bore clearance path being at a lower pressure than the HPC.

In yet another embodiment of the inventive concept, the second piston includes a spring disposed within the hollow interior thereof, the spring biasing the second piston outward of the second bore.

In still another embodiment of the inventive concept, the VFT further comprises a shared reservoir disposed at a back side of the housing to provide fluid to the second diameter of the first bore and the second bore LPC to HPC inlet.

In yet another embodiment of the inventive concept, the first piston includes a series of ratchet grooves formed around an outer surface and extending along a length thereof; and the first bore includes a ratchet clip extending therein to capture one of the ratchet grooves to prevent the primary piston from sliding into the first bore.

The foregoing embodiments of the present inventive concept also provide a variable force tensioner (VFT) that includes: a housing with an inlet therein to receive fluid from an external source; a bore including inner walls having a first diameter and an end portion thereof; and a primary piston slidably disposed within the inner walls of the bore and including: a reservoir disposed at a first end thereof and including a first inlet to release fluid from the reservoir; and a chamber disposed at a second end thereof, the chamber being formed of a top portion, two sides of the second end of the piston, and the end portion of the bore, the chamber including a check valve disposed therein connected to the first reservoir inlet to control a flow of the fluid from the reservoir to the chamber to create a high pressure therein to force the piston to extend outward of the bore.

In an embodiment of the inventive concept, the chamber further includes a spring disposed therein and seated on the end portion of the bore to bias the piston outward of the bore.

In another embodiment of the inventive concept, the VFT further comprises at least one pressure piston bore clearance path extending along a side of the bore from the end portion thereof to the second diameter thereof to leak fluid from the high pressure chamber back to the reservoir.

In yet another embodiment of the inventive concept, the VFT further comprises a secondary reservoir disposed at a back side of the housing to feed the fluid to the housing inlet.

In another embodiment of the inventive concept, the bore includes a second diameter wider than the first diameter and disposed within a section of the first diameter to transfer additional fluid from the housing inlet to a second inlet of the reservoir.

The foregoing embodiments of the present inventive concept also provide a variable force tensioner (VFT) that includes a housing; a primary piston slidingly disposed within a first bore in the housing, the primary piston having: a first section including a primary reservoir, the primary reservoir including an inlet to receive oil therein from an external source and an outlet at a first end extending into the first bore; and a second section including a high pressure chamber disposed between the primary reservoir and a bottom end of the first bore, the high pressure chamber including a check valve connected to the outlet to receive oil from the primary reservoir and a spring therein to provide a bias on the primary piston to extend out of the first bore.

In an embodiment of the inventive concept, the VFT includes a high pressure piston bore clearance path extending along a groove in the first bore from the high pressure chamber to the inlet to return oil back to the primary reservoir.

In another embodiment of the inventive concept, the the first bore comprises a first diameter extending along the length thereof in which the piston slides therein, and a second diameter larger than the first diameter and extending along a portion of the first bore to receive oil from the housing inlet and to release oil to the primary piston inlet when the primary piston inlet slides along the second diameter.

DETAILED DESCRIPTION OF THE INVENTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As discussed above, this disclosure pertains to dual hydraulic variable tensioners (VFT), and more particularly, to a dual hydraulic force tensioner with a reservoir integrated into a primary piston thereof that can provide for faster fluid flow into a high pressure chamber of the piston.

Figure 3A:
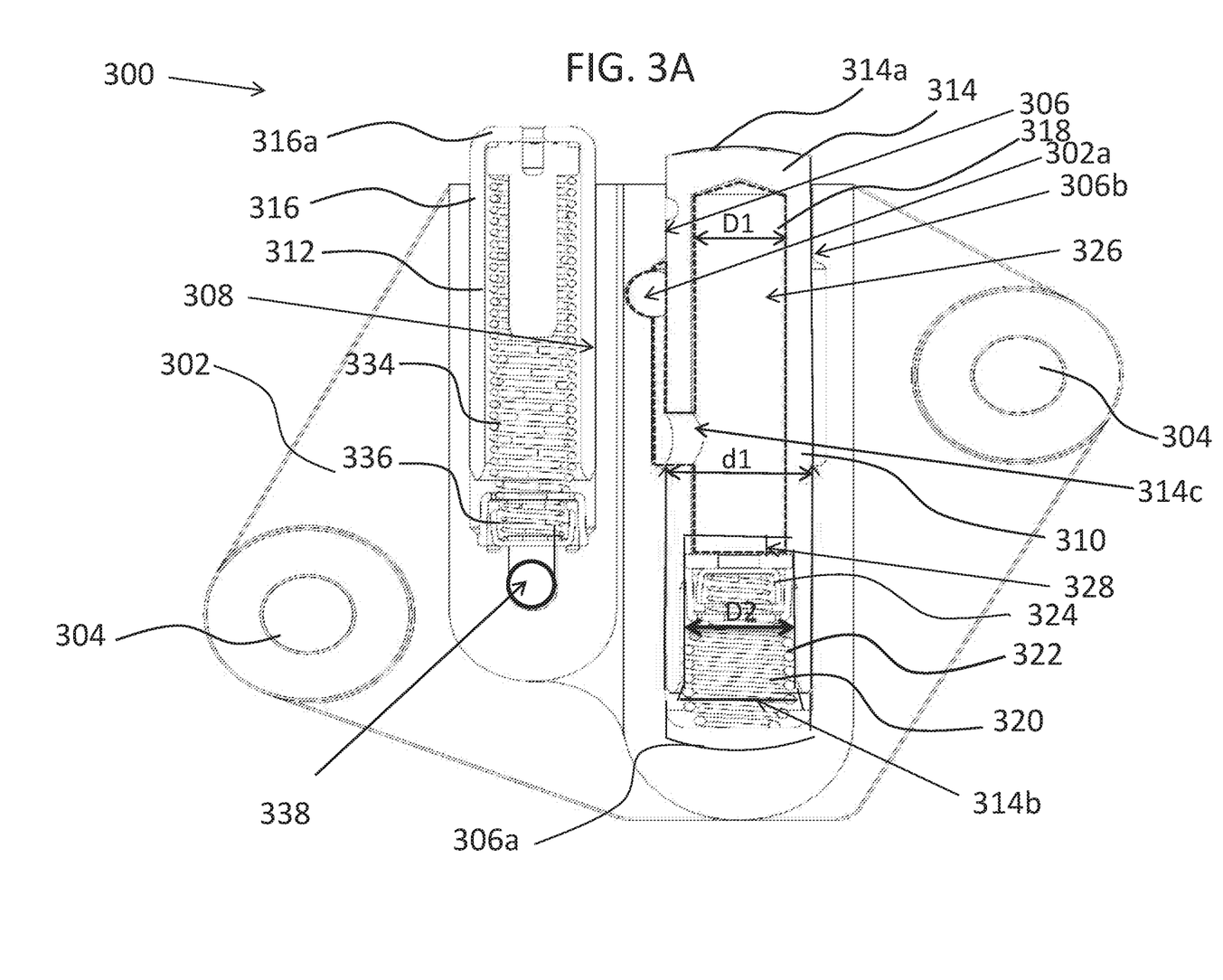
FIG. 3A shows a perspective view of a front side of a variable force tensioner (VFT) according to an exemplary embodiment of the present inventive concept.
Figure 3B:
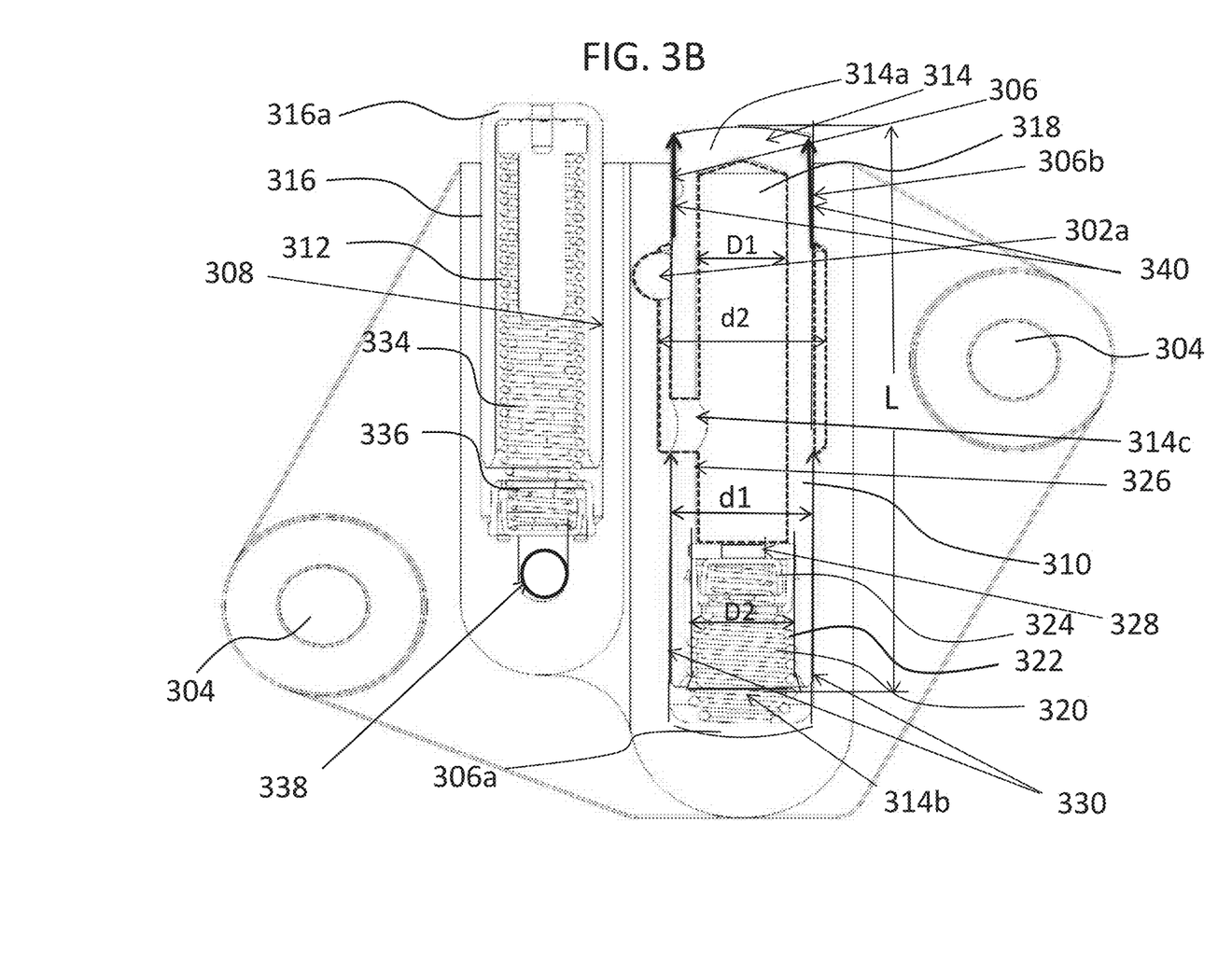
FIG. 3B shows a perspective view of a front side of a variable force tensioner (VFT) according to another exemplary embodiment of the present inventive concept.
Figure 4:
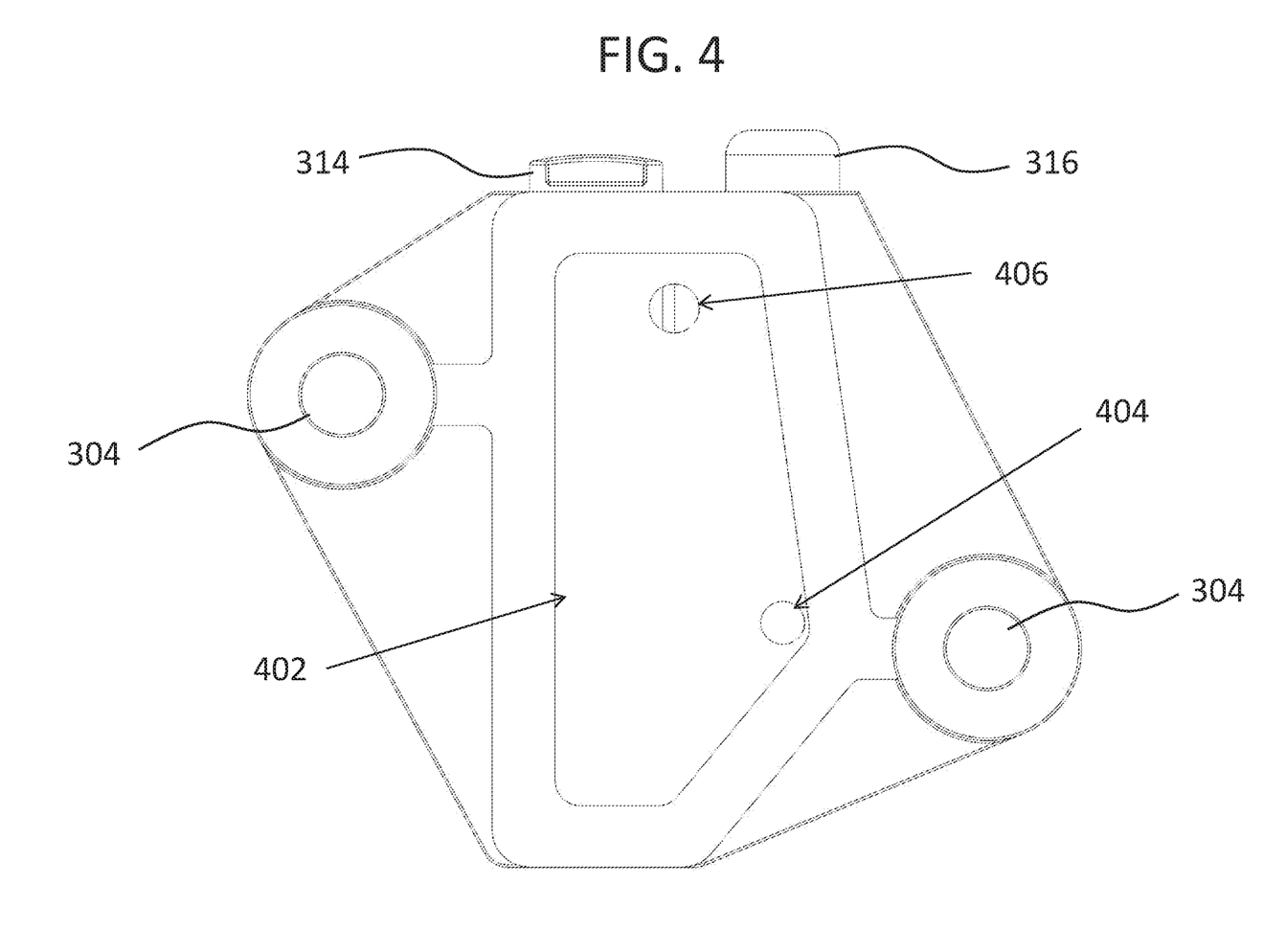
FIG. 4 shows a perspective view of a back side of VFT according to the exemplary embodiment illustrated in FIG. 3A.

The dual hydraulic variable tensioner (VFT) 300 of FIGS. 3A through 4 can be used for an endless loop, flexible, power transmission member for an internal combustion engine of a motor vehicle, such as a chain or belt. The power transmission member encircles a drive sprocket driven by a drive shaft, such as a crank shaft of the engine, and at least one driven sprocket supported by a driven shaft, such as a cam shaft of the engine.

Referring to FIG. 3A, a dual hydraulic variable force tensioner (VFT) 300 in accordance with an exemplary embodiment of the present inventive concept is illustrated. The dual hydraulic variable force tensioner (VFT) 300 can be used to maintain a predetermined tension on a chain or belt (not illustrated) through a tensioner arm (see FIG. 6). The dual hydraulic VFT 300 includes a housing 302 that can be fastened to a frame of a motor vehicle (not illustrated) or other device by inserting connectors, such as bolts, or other type fasteners that will provide the intended purpose of connecting the housing 302, to a motor vehicle or other chain or belt driven devices, through connector holes 304.

The dual hydraulic VFT 300 can include primary and secondary axially extending bores 306 and 308 in which a primary piston chamber 310 and a secondary piston chamber 312 can be formed therein, respectively. A primary piston 314 can be disposed within the primary bore 306, and a secondary piston 316 can be disposed within the secondary bore 308.

The primary bore 306 can include a closed end 306a and sidewalls 306b including a first portion having a diameter d1 extending along a length of the bore 306. An inlet 302a can be provided through the housing 302 to receive additional oil or other fluid from an external source (discussed in more detail below). The inlet 302a can be disposed in fluid communication with an external oil or other fluid supply (not illustrated) for supplying oil or other fluid to the primary piston 314.

The primary piston 314 can include a body having a first end 314a exposed with respect to the bore 306, a second end 314b disposed within the bore 306, a length L extending between the first end 314a and the second end 314b thereof, and an inlet 314c which is disposed in communication with the inside of the primary piston 314 to receive return fluid as described further below. The primary piston 314 can be split into two chambers, including a low pressure chamber (LPC) 318 disposed towards the first end 314a thereof and a high pressure chamber (HPC) 320 disposed towards the second end 314b thereof, the LPC 318 having a smaller diameter D1 than a diameter D2 of the HPC 320. A check valve 324 can be provided between the LPC 318 and the HPC 320 to control the flow of oil from the LPC 318 to the HPC 320. A low pressure chamber (LPC) inlet 328 can be provided between the HPC 318 and the check valve 324 to permit the oil to flow from the LPC 318 to the check valve 324.

The HPC 320 can be formed between the check valve 324 and the closed end 306a of the primary bore 306. As such the HPC 320 varies in length depending on the distance in which the primary piston 314 extends away from the closed end 306a of the first bore 306. The primary piston 314 can also include a piston spring 322 disposed in the HPC 320 and seated at the closed end 306a of the primary bore 306 to bias the piston 314 away from the closed end 306a of the bore 306.

The primary LPC 318 may comprise a piston reservoir 326 which contains oil or another type pressure fluid therein. This oil flows through the LPC to HPC inlet 328 and the check valve 324 and into the HPC 320. The piston spring 322 maintains a force on the primary piston 314 to keep the piston 314 from sliding further into the primary bore 306 in the case of a drop in pressure within the HPC 320. The HPC 320 also maintains a force on the primary piston 314 as a result of the pressurized oil contained therein, which is received from the reservoir 326.

In another embodiment of the inventive concept, as illustrated in FIG. 3B, the primary bore 306 can include a second portion having a second diameter d2 wider than the first diameter d1 of the first portion of the bore 306 and disposed within a section of the first portion. The second portion having the diameter d2 transfers additional oil/fluid from an external source connected with the inlet 302a of the housing 302 to the inlet 314c of the primary reservoir 326.

Figure 5:
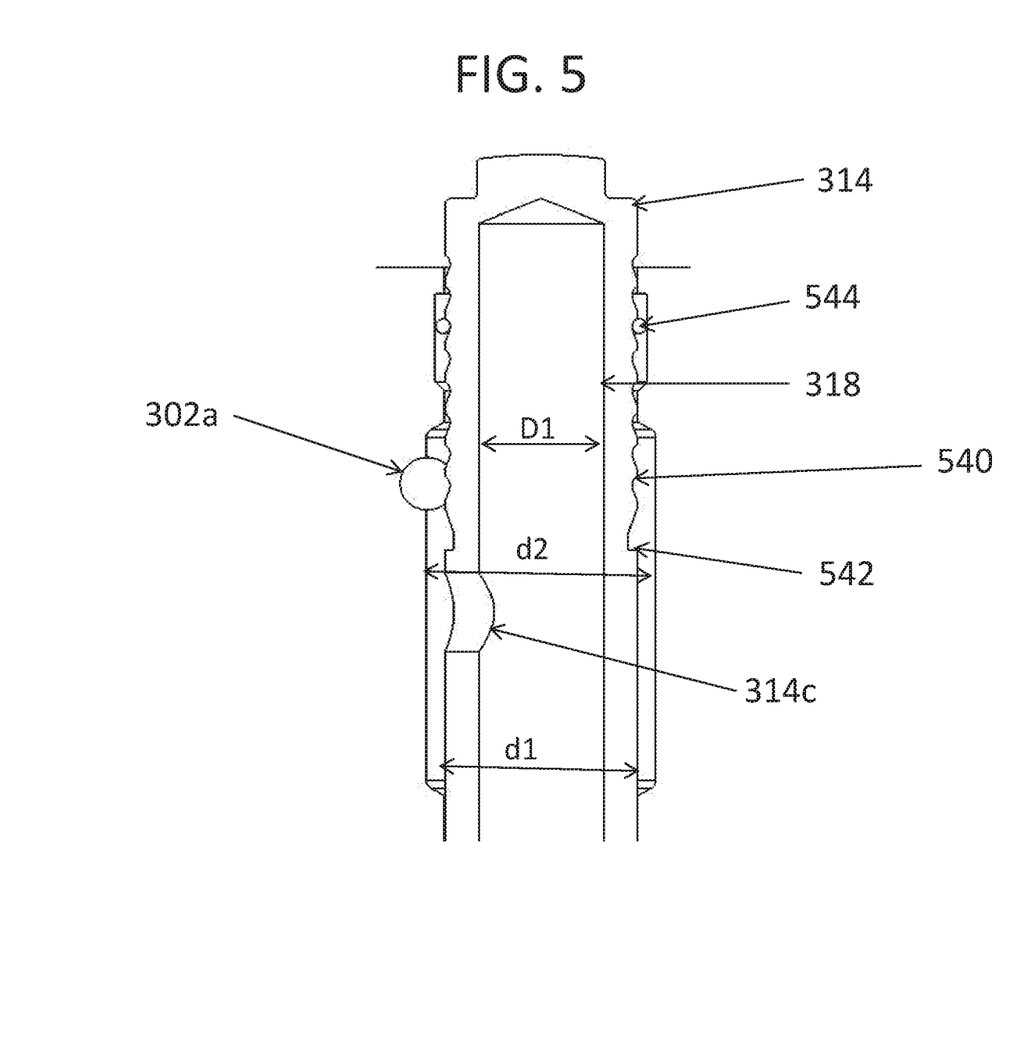
FIG. 5 shows a primary piston and bore combination according to yet another exemplary embodiment of the present inventive concept.

In another exemplary embodiment of the present inventive concept, as illustrated in FIG. 5, an outer circumference of the primary piston 314 can include a series of ratchet grooves 540 along a length thereof, with a stop groove 542 closer to the inlet 314c and larger than the ratchet grooves 540 in order to capture a ratchet clip 544. The ratchet clip 544 can be an expandable clip that ratchets (or expands) and contracts in and out of the ratchet grooves 540 as the primary piston 314 extends out of the primary bore 306 due to the forces of the HPC 320 and the spring 322 applied to the primary piston 314. The ratchet clip 544 prevents the primary piston 314 from sliding back into the primary piston bore 306 when the tensioner arm (see FIG. 6) pushes on the primary piston 314 due to a force from the chain or belt being in contact with the tensioner arm.

Referring back to FIG. 3B, when a chain or belt under tension becomes worn and/or doesn't have a high load, and thus begins to slack, additional fluid can be provided to the HPC 320 from the reservoir 326 through the LPC to HPC inlet 328 and the check valve 324, causing the primary piston 314 to be forced in a direction to extend further out of the primary bore 306. As a result the first end 314a of the primary piston 314 continues to apply a force on the tensioner arm (see FIG. 6), thus keeping the chain or belt taut and under control.

The primary reservoir 326 can also include the piston inlet 314c to receive additional oil as the primary reservoir 326 becomes depleted as a result of the oil being fed from the reservoir 326 to the HPC 320. The piston inlet 314c receives oil from the second portion d2 of the primary bore 306. As described below in more detail with reference to FIG. 4, the second portion d2 of the bore 306 receives fluid from an external source connected to the housing inlet 302a.

In the case where too much pressure may occur in the HPC 320, some of the fluid therein is enabled to leak out along one or more high pressure piston bore clearance paths 330 formed axially along a lower portion of the outer surface of the primary piston 314. Since the high pressure piston bore clearance paths 330 extend directly back to the reservoir 326 (see arrows 330) from the HPC 320, and acts against the reservoir pressure, the amount of piston to bore clearance leakage can be reduced as compared to the conventional tensioners as illustrated in FIGS. 1 and 2, where the clearance leakage path acts against atmospheric pressure. This lower clearance leakage results in lower clearance leakage variation and more consistent tensioner performance. Furthermore, the oil that passes through the piston bore clearance path(s) 330 is recycled. One or more secondary piston to bore clearance paths 340 are formed axially along an upper portion of the outer surface of the primary piston 314 and extend from the second portion d2 of the bore 306 upward and out through the top of the bore 306.

As described above, the secondary piston 316 can be disposed in the secondary bore 308 and can be hollow inside along its axial length. The secondary chamber 312 is a high pressure chamber (HPC) and can be formed by a combination of the hollow interior of the secondary piston 316 and the secondary bore 308. The secondary piston 316 may include a secondary piston spring 334 extending through the hollow interior portion thereof to maintain a force on the piston 316 and to keep the piston 316 from sliding further into the secondary bore 308.

The secondary piston 316 may also include a secondary one-way check valve 336 that allows the flow of oil in one direction into the secondary HPC 312. More specifically, the flow of fluid through the secondary check valve 336 can occur when additional fluid is provided through a secondary low pressure chamber (LPC) to high pressure chamber (HPC) inlet 338 to maintain a constant pressure within the secondary HPC 312. The oil which flows through the secondary LPC to HPC inlet 338 can be received from an external fluid source as described in more detail with reference to FIG. 4.

As illustrated in an exemplary embodiment of FIG. 4, fluid which enters the secondary LPC to HPC inlet 338, as illustrated in FIGS. 3A and 3B, can be received from a shared reservoir 402 disposed at a back portion of the housing 302 of the dual hydraulic variable force tensioner (VFT) 300. More specifically, an outlet 404 of the shared reservoir 402 can provide fluid to the secondary piston chamber 312 through the secondary LPC to HPC inlet 338, while an outlet 406 of the shared reservoir 402 can provide fluid to the primary reservoir 326 of the piston 314 through the housing inlet 302a and the second portion d2 of the primary bore 306.

When the dual hydraulic variable force tensioner (VFT) 300 is tensioning a new chain or belt, during operation, oil can be supplied to the primary HPC 320 from the primary reservoir 326 through the LPC to HPC inlet 328 and the check valve 324. This oil creates a pressure within the HPC 320 which provides a force that biases the primary piston 314 outwards of the primary bore 306, together with the force provided by the primary piston spring 322. The forces provided by the HPC 320 and the spring 322 are transferred by the primary piston 314 to the tensioner arm (see FIG. 6), which in turn biases a span of the closed loop chain or belt of an engine. At the same time, the secondary piston 316 is forced outwards of the secondary bore 308 by forces of the secondary piston spring 334 and the fluid supplied to the secondary HPC 312 from the secondary PLC to HPC inlet 338. The forces provided by the secondary HPC 316 and the spring 334 are transferred by the secondary piston 316 to the tensioner arm, which in turn biases a span of the closed loop chain or belt of an engine.

When the dual hydraulic variable force tensioner (VFT) 300 is tensioning a worn chain or belt, or a chain or belt having little or no load applied thereto, during operation, oil can be supplied to the primary HPC 320 through the primary LPC to HPC inlet 328 and through the check valve 324, creating a pressure which forces the primary piston 314 outwards from the primary bore 306, in addition to the force applied to the primary piston 314 by the primary piston spring 322. These forces provided by the HPC 320 and the spring 322 are transferred by the primary piston 314 to the tensioner arm, which in turn biases a span of the closed loop chain or belt of an engine. At the same time, the secondary piston 316 is also forced outwards further from the secondary bore 308 by the secondary piston spring 334. As the chain or belt wears further, additional slack occurs in the chain or belt, and the primary piston 314 and secondary piston 316 both need to be extended further outwards from their respective primary and secondary bores 306 and 308 to continue to apply a bias to the tension arm to adequately maintain tension on the chain or belt.

When the dual hydraulic variable force tensioner (VFT) 300 is tensioning a chain or belt during a high dynamic chain or belt load via the tensioner arm (see FIG. 6), the high dynamic load force from the chain or belt alternately pushes the primary piston 314 and the secondary piston 316 inwards of their respective bores 306 and 308, and then outwards therefrom. Inward movement of the secondary piston 316 is resisted by the fluid pressure in the secondary HPC 312 created by the one-way check valve 336, which stops the fluid in the secondary HPC 312 from flowing back through the secondary LPC to HPC inlet 338. As a result, the secondary piston 316 moves outward by the force of the spring 334. This operation causes the secondary piston 316 to "pump up," drawing more fluid through the check valve 336 into the secondary HPC 312, which in turn causes the first end 316a of the secondary piston 316 to exert force on the tensioner arm. Inward movement of the primary piston 314 is prevented by the pressure within the primary HPC 320.

In the alternative embodiment illustrated in FIG. 5, inward movement of the primary piston 314 with respect to the primary bore 306 can also be prevented by the ratchet clip 544 being seated in one of the ratchet grooves 540.

Figure 6:
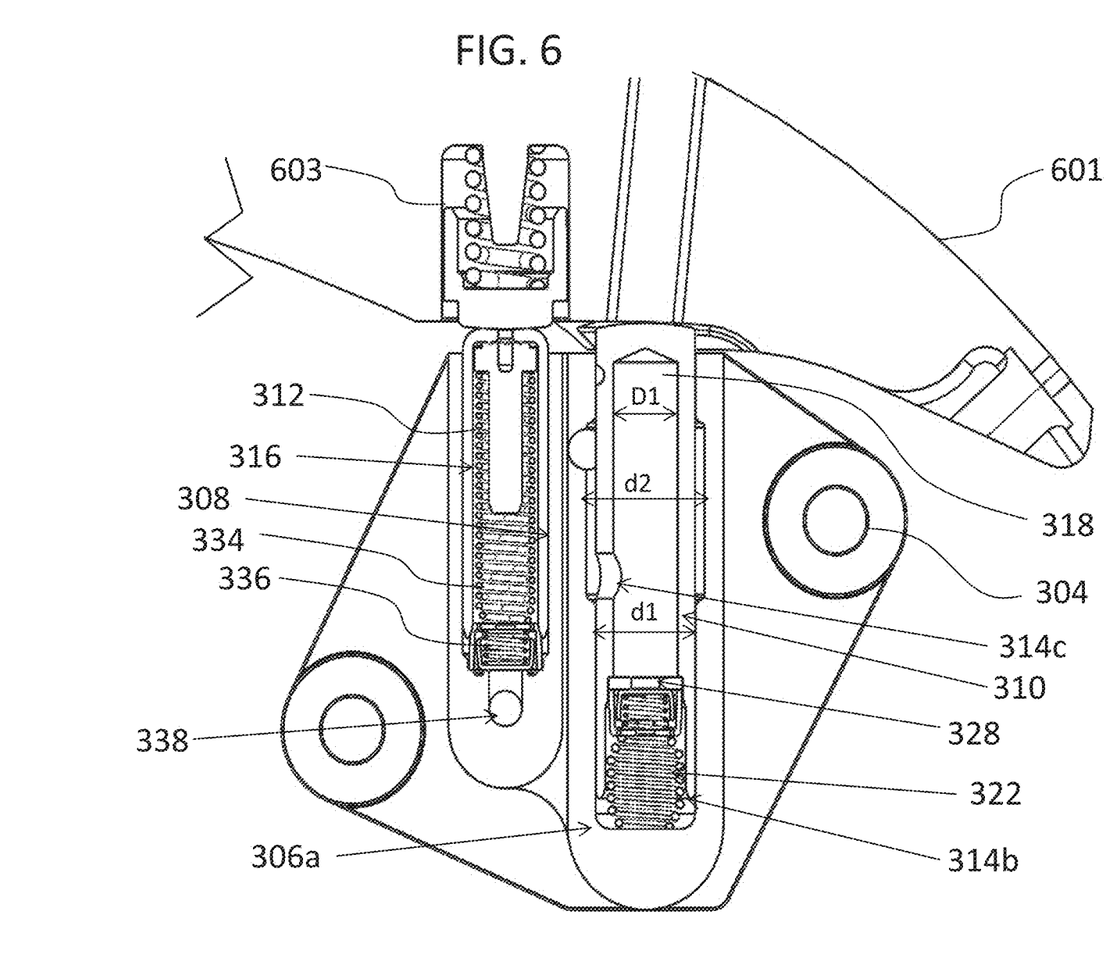
FIG. 6 shows the variable force tensioner of FIG. 3B in operation.

FIG. 6 illustrates the variable force tensioner of FIG. 3B in operation as the primary piston 310 is engaged with a tensioner arm 601. The secondary piston 312 is in contact with a stiff spring 603 located inside the tensioner arm 601.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:
1. A variable force tensioner (VFT), comprising:
  a housing;
  a first bore disposed in the housing and having a bottom end;
  a primary piston slidably disposed in the first bore and including a low pressure chamber (LPC) disposed therein and a low pressure chamber to high pressure chamber (LPC to HPC) inlet connected at one end thereof, the primary piston creating a high pressure chamber (HPC) between a bottom portion thereof and the bottom end of the first bore when fluid is fed through the LPC to HPC inlet from the LPC;
  a spring disposed within the high pressure chamber and applying a bias on the primary piston away from the bottom end of the first bore;
  a check valve connected to the LPC to HPC inlet and configured to allow fluid to flow from the low pressure chamber to the high pressure chamber to force the primary piston to extend outward of the first bore; and
  a second bore disposed in the housing and including a second piston having a hollow interior, a second check valve and a second bore LPC to HPC inlet, the second check valve being connected between the second piston and the second bore LPC to HPC inlet to control the flow of fluid from the second bore LPC to HPC inlet to the hollow interior of the second piston to force the second piston to extend outward of the second bore.

2. The VFT of claim 1, wherein the lower pressure chamber comprises a primary reservoir.

3. The VFT of claim 2, wherein the primary reservoir includes a second inlet to receive fluid from an external source.

4. The VFT of claim 3, wherein the first bore includes a first portion and a second portion, the first portion having a first diameter and the second portion having a second diameter wider than the first diameter and disposed within a section of the first portion and transfers additional fluid from the external source to the second inlet of the primary reservoir.

5. The VFT of claim 4, wherein a lower portion of the primary piston includes at least one high pressure piston bore clearance path extending axially along an external side surface thereof from the HPC to the primary reservoir, allowing excess fluid to flow back to the primary reservoir, the at least one high pressure piston bore clearance path having a pressure that acts against the primary reservoir pressure.

6. The VFT of claim 2, wherein the second piston includes a spring disposed within the hollow interior thereof, the spring biasing the second piston outward of the second bore.

7. The VFT of claim 3, further comprising:
a shared reservoir disposed at a back side of the housing to provide fluid to the second diameter of the first bore and the second bore LPC to HPC inlet.

8. The VFT of claim 1, wherein;
the primary piston includes a series of ratchet grooves formed around an outer surface and extending along a length thereof; and
the first bore includes a ratchet clip extending therein to capture one of the ratchet grooves to prevent the primary piston from sliding into the first bore.

* * * * *